Patented Jan. 10, 1939

2,143,088

UNITED STATES PATENT OFFICE 2,143,088

THERAPEUTIC AGENT

George E. Rockwell, Milford, Ohio

No Drawing. Application May 28, 1937,
Serial No. 145,384

9 Claims. (Cl. 167—58)

This invention relates to therapeutic agents and more particularly to an agent adapted for intravenous injection for the purpose of adsorbing bacterial toxins, stimulating phagocytosis, and activating the reticulo-endothelium system.

The intravenous injection of charcoal or carbon particles is not new. The excellent adsorptive powers of carbon are well known and many attempts have been made in one way or another to use these advantageous qualities of charcoal in the treatment of human beings for the purpose of removing a toxic condition. The uses of charcoal for this purpose in the past have, however, been limited by reason of the fact that dangerous results were apt to result from the action of the carbon particles themselves. They might be spicular in form and cause puncturing of smaller blood vessels leading to the formation of blood clots and the like. The size of the particles and their tendency to conglomerate has also caused mechanical blockage of the blood vessels. Furthermore, difficulty has always been encountered in passing the material through the bore of a hypodermic needle. Another difficulty has been due to the rapid sedimentation of the carbon particles in a very short space of time, particularly where the injection is not made very promptly after the syringe is filled.

In view of these various difficulties it is an object of my invention to provide a material which may be injected intravenously where indicated with entire safety. Another object of my invention is to provide material which will be free flowing, in which the particles will not conglomerate, in which sedimentation is prevented or substantially reduced, and which will not cause clogging of hypodermic needles, or of the vascular system.

Other objects of my invention include the provision of a material as above outlined which will be more efficient in carrying out its purpose, which will be sterile and standardized.

These and other objects of my invention which will appear hereinafter to one skilled in the art or which will be pointed out, I accomplish by that composition of matter and by that process of which I shall now describe an exemplary embodiment.

Briefly, in the practice of my invention, I provide a suspension of minute classified particles of activated carbon (this includes carbon from any source) in dry form or in some sort of a carrier. This suspension is such that each particle acts as an entity, and as a result, has increased fluidity or workability and a decreased rate of settling. This is what is meant by the term "dispersed" as used in the claims. These results are accomplished by means of a dispersing agent or a protective agent alone, or by a combination of a dispersing agent and protective agent, or by means of an agent having dispersing and protective properties. In using the term "protective agent", I include, of course, protective colloids. The use of these agents permits fine grinding to a much finer degree than can be accomplished without them, because they cause each particle to act as an entity. This enables me to classify the particles as to size by filtration, air separation, wet floatation, wet classification or centrifuging.

As a carrier I may use a large number of substances. Examples of carriers are water, water miscible solvents, saline solution, and glucose. Without limiting myself, I prefer to use sterile double distilled water.

Many dispersing agents are known in the art; among these are, by way of example, the polymerized organic salts of sulphonic acids of the alkyl-aryl type, the alkylated naphthalene sulphonic acid type, and colloidal dyes of various types. Entirely without limitation, I prefer to use Congo red, which is a colloidal dye, and while various amounts of a dispersing agent may be used, I have found it preferable to use one per cent of the Congo red by weight of the carbon.

As a protective agent, or in some instances as a combination of dispersing agent and protective agent, many materials may be used. As examples, and without limitation, I may employ dextrose, ethylene glycol, triethanolamine, gum acacia and others. I have found it desirable to use a twenty-five per cent solution of dextrose in double distilled water. Some substances as gum acacia, for example, while they act properly as protective agents have the objection that they clog up the pores of the carbon and thus reduce its adsorptive powers; and I therefore prefer not to use such substances.

An important feature of my invention resides in the size and form of the carbon particles. The particles must be small enough so that they will not produce mechanical obstruction in the bore of the hypodermic needle or in any part of the vascular system. The particles must act as entities so that they will not conglomerate and ball up, and cause obstructions, as above outlined. The particles must not have sharp spicules or projections which might puncture the interior of a blood vessel and produce ulceration or the like.

My invention makes it possible to prepare a suspension of carbon particles which will not be subject to any of the objections discussed above. I have found it desirable to use no carbon particles larger than a normal human red blood corpuscle, and I prefer to use a suspension in which none of the particles are larger than seven microns. It is possible by my invention to prepare suspensions in which none of the particles are larger than three microns, and, as a matter of fact, suspensions can be made in which the size of the maximum particles is even more minute, depending only on the fineness of grinding.

Another important item is that carbon or charcoal particles must be purified and activated. I prefer to carry out this step by treating the carbon or charcoal with hydrochloric acid and then washing it free of the acid with double distilled water.

The purified carbon or charcoal is then dried and ground, and is then activated by the action of hydrogen passed through it while it is held at a temperature at approximately 300° F. These steps may be accomplished by any of the well known methods.

A definite amount of the activated carbon is weighed out and mixed with the dispersing agent and, if desired, with the protective agent in the amount desired. By way of example, and without limitation, I prefer to use Congo red alone or dextrose alone, or a combination of the two in amounts of one per cent of Congo red on the weight of the carbon or four hundred per cent of dextrose on the weight of the carbon or a combination of both. This mixture is put in a mill and ground. This milling may be accomplished dry, but I prefer to add double distilled water and mill until the material is ground satisfactorily. I prefer to add enough water to make a six per cent concentration of the carbon. The milling is continued until microscopic examination shows that most of the particles are of the desired fineness. The presence of the dispersing agent or the protective agent or both permits a much finer grinding than is otherwise possible, and increases the output of the mill.

The next important step in my process is particle size classification. This can be accomplished, depending upon whether the milling was done wet or dry, by one of the well known methods, such as filtration, air separation, wet floatation, wet classification or others. Without limiting myself, I prefer to use the filtration method.

If the milling was done wet, sufficient double distilled water is added either before or after particle size classification, to bring the concentration of the carbon or charcoal to that desired. I prefer to use concentrations of between one and three per cent; of course, if the milling has been done in the dry state and it is desired to keep the carbon particles in a dry state until an injection is to be given, then the double distilled water is added to the carbon just before it is to be used and thoroughly mixed at that time.

The next step in my process comprises the sterilization of the agent. This may be done in a number of ways, although I prefer to use heat. Depending upon the type of protective agent, or dispersing agent used, I either sterilize it in the Arnold for thirty to sixty minutes on three successive days, or in the autoclave at fifteen pounds pressure for a period of twenty minutes. Subcultures are made as a control to be certain that the sterilization is complete.

The next step in my process consists in standardization which may also be done in a number of ways. Without limitation, I prefer to standardize the agent on the per cent concentration of carbon or charcoal, the number of particles present in a unit weight or volume, its adsorptive capacity for certain dyes or colors and bacterial toxins such as diphtheria toxin or anaerobic autolysate of pneumococcus, and its biological activity.

I may in practice, after sterilization, introduce "Merthiolate" or any other germicide or antiseptic into the composition in small quantities, such as 1:20,000 "Merthiolate". This is a standard procedure in biological products and is done to inhibit the growth and destroy any organisms which might accidently be contaminated into the material while withdrawing part of the material with a hypodermic syringe, e. g. when the needle is plunged through the rubber cap.

The therapeutic agent according to my invention by virtue of its high adsorptive qualities may also serve as a vehicle for carrying other drugs, bacterial toxins, toxoids, or biological products for immunization purposes. In this way much higher doses may be given.

It will thus be seen that I have provided a therapeutic agent which is advantageous in the adsorption of toxic materials, whether bacterial or from other sources, which stimulates phagocytosis and activates the reticulo-endothelium system, and which is entirely safe and which will not cause mechanical difficulties; and that I have also shown an advantageous process for producing a therapeutic agent.

It is to be understood that I am not in any way limited with regard to the source or type of carbon or charcoal, and that modifications may be made without departing from the spirit of my invention and that I do not intend to limit myself otherwise than as pointed out in the claims which follow.

Having now fully described my invention, what I claim as new and desire to secure by Letters Patent is:—

1. The method of preparing a carbon particle suspension for therapeutic purposes, which includes the steps of making first a concentrated suspension of carbon particles, then milling the mixture in the concentrated state until no carbon particle is larger than a human red blood corpuscle, then reducing the concentration, dispersing, and sterilizing the suspension.

2. The method of preparing a carbon particle suspension for therapeutic purposes, which includes the steps of activating the carbon, grinding it, mixing it with a substance which will cause the particles to be discrete and retain their individuality so that they may act as entities, milling the mixture to the desired fineness, separating out all carbon particles larger than a human red blood corpuscle, dispersing, and sterilizing the suspension.

3. A therapeutic agent for intravenous injection adapted to be mixed with water immediately prior to an injection, comprising carbon particles not larger than a human red blood corpuscle, together with an agent which will cause said particles to be discrete and retain their individuality so that they may act as entities.

4. A therapeutic agent comprising a dispersed suspension of carbon particles in a carrier, the size of said carbon particles being not greater than a human red blood corpuscle, and being predominantly 3 microns or over in size.

5. A therapeutic agent according to claim 4, in which the dispersing agent or carrier is a glucose solution.

6. A therapeutic agent according to claim 4, in which the dispersing agent is Congo red.

7. A filtered therapeutic agent according to claim 4.

8. A therapeutic agent according to claim 4, carrying an immunizing agent.

9. A sterile therapeutic agent comprising nonspicular carbon particles not larger than a human red blood corpuscle and predominantly 3 microns or over in size in suspension in a carrier, said particles being dispersed so that the cohesive forces between the primary particles are reduced, thus breaking up flocs or agglomerates and forcing said particles to be discrete and hence free to act as entities.

GEORGE E. ROCKWELL.